United States Patent
Cimmino et al.

(10) Patent No.: US 6,847,878 B2
(45) Date of Patent: Jan. 25, 2005

(54) METHOD FOR THE PERFORMANCE OF THE GEAR DISENGAGEMENT IN A SERVO-CONTROLLED MANUAL GEAR CHANGE

(75) Inventors: Francesco Cimmino, Turin (IT); Fabrizio Amisano, Turin (IT)

(73) Assignee: Magneti Marelli Powertrain, S.p.A. (IT)

(*) Notice: Subject to any disclaimer, the term of this patent is extended or adjusted under 35 U.S.C. 154(b) by 267 days.

(21) Appl. No.: 09/983,763
(22) Filed: Oct. 25, 2001

(65) Prior Publication Data

US 2002/0062187 A1 May 23, 2002

(30) Foreign Application Priority Data

Oct. 27, 2000 (IT) .................................. BO2000A0627

(51) Int. Cl.[7] ........................ G06F 17/00; B60K 41/04
(52) U.S. Cl. ................................. 701/56; 477/34
(58) Field of Search ........................ 701/36, 51, 53–56, 701/58–59, 66–69, 71, 82, 84, 87, 90, 101, 103–105; 477/15, 17, 34, 39, 41, 43, 70, 74, 75, 83, 77–79, 86, 107, 89–90, 101, 115, 116, 166, 171, 180, 173–174, 181

(56) References Cited

U.S. PATENT DOCUMENTS 6,234,933 B1 * 5/2001 Tornatore .................... 477/78
6,468,182 B1 * 10/2002 Brandt et al. ................ 477/98

FOREIGN PATENT DOCUMENTS

| EP | 0276609 | 8/1988 | |
| FR | 2431642 | 2/1980 | |
| FR | 2 431 642 | * 2/1980 | ............. F16H/5/40 |

OTHER PUBLICATIONS

EPO Search Report, Dated Feb. 13, 2002.

* cited by examiner

Primary Examiner—Thu V. Nguyen
(74) Attorney, Agent, or Firm—Hall, Myers, Vande, Sande & Pequignot

(57) ABSTRACT

A method for the performance of the gear disengagement in a servo-controlled manual gear change, according to which an oscillation is generated with respect to the angular speed of a primary shaft of the gear change by abruptly opening the relative clutch and the disengagement of the gear is performed around the maximum amplitude of an oscillation half-wave, when this oscillation has caused the angular speed of the primary shaft to be relatively close to the angular speed that the primary shaft has to assume to carry out the engagement of the subsequent gear.

36 Claims, 3 Drawing Sheets

METHOD FOR THE PERFORMANCE OF THE GEAR DISENGAGEMENT IN A SERVO-CONTROLLED MANUAL GEAR CHANGE

The present invention relates to a method for the performance of the gear disengagement in a servo-controlled manual gear change.

BACKGROUND OF THE INVENTION

Servo-controlled manual gear changes are increasingly widespread and, from a structural point of view, are entirely similar to a conventional manual gear change except for the fact that the control pedals and levers that can be actuated by the driver are replaced by corresponding electrical or hydraulic servo-controls. When using a servo-controlled manual gear change, the driver merely has to send a command to a control unit to change to a higher or a lower gear and the control unit independently performs the gear change by acting on the control of the butterfly valve and on the various servo-controls.

In normal driving conditions using a servo-controlled gear change, it is necessary to ensure a high level of comfort for passengers during the gear change stages; recent studies have shown that in order to ensure a high level of comfort for passengers it is necessary for the gear change to be performed rapidly without triggering oscillations likely to be noticed by the passengers.

It is known that the time duration of the gear change is determined largely by the synchronisation time of the new gear, i.e. by the time taken by the synchronisers to match the angular speed of the primary shaft of the gear change to the angular speed imposed by the new ratio.

In order to reduce the synchronisation time during the gear progression, i.e. during a change from a lower to a higher gear, it has been proposed to use a braking device coupled to the primary shaft of the gear change in order to brake the primary shaft and rapidly to match the angular speed of the primary shaft to the angular speed imposed by the new ratio. This solution is relatively costly and complicated, however, because it is necessary to provide and control a brake coupled to the primary shaft of the gear change.

SUMMARY OF THE INVENTION

The object of the present invention is to provide a method for the performance of the gear disengagement in a servo-controlled manual gear change, which is free from the drawbacks described above and which is in particular simple and economic to embody.

The present invention therefore relates to a method for the performance of the gear disengagement in a servo-controlled manual gear change as set out in claim 1.

BRIEF DESCRIPTION OF THE DRAWINGS

The present invention will be described below with reference to the accompanying drawings which show a non-limiting embodiment thereof and in which.

DETAILED DESCRIPTION OF THE INVENTION

Figure 1:
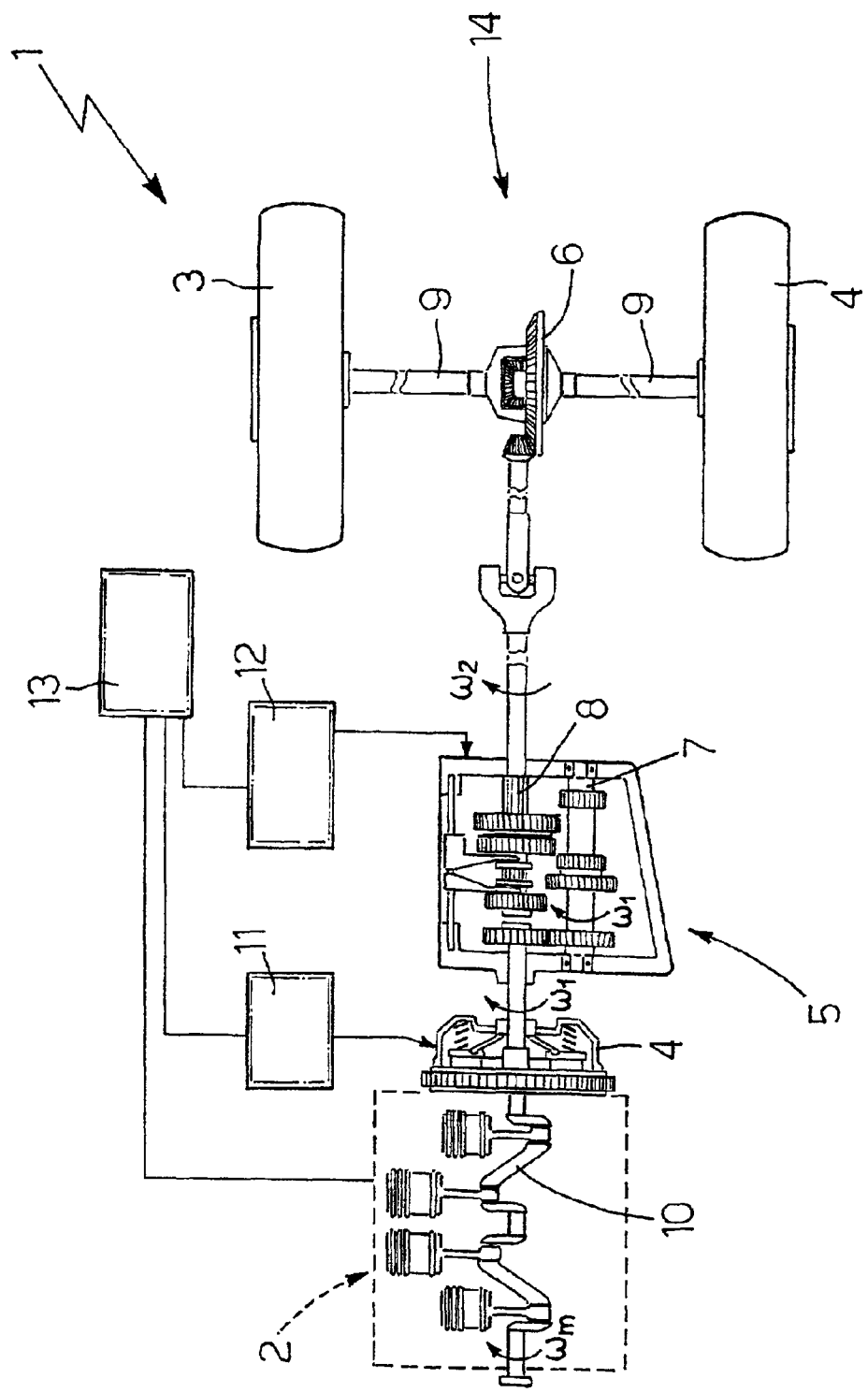
FIG. 1 is a diagrammatic view of the engine and transmission members of a vehicle provided with a servo-assisted manual gear change.

In FIG. 1, the transmission members of a known vehicle are shown overall by 1 and are adapted to transmit motion from an engine 2 to a pair of drive wheels 3. The transmission members 1 comprise a clutch 4, a servo-controlled manual gear change 5 and a differential 6; the gear change 5 in turn comprises a primary shaft 7 which rotates at an angular speed $\omega_1(t)$, and a secondary shaft 8 which rotates at an angular speed $\omega_2(t)$ and transmits movement to the drive wheels 3 by means of the differential 6 and a pair of axle shafts 9. By means of the interposition of the clutch 3, the primary shaft 7 is connected to a drive shaft 10 which is caused to rotate by the engine 2 and rotates at an angular speed $\omega_m(t)$.

The transmission members 1 further comprise a hydraulic servo-control 11 of known type which is adapted to control the clutch 4, and a hydraulic servo-control 12 of known type which is adapted to control the position of the secondary shaft 8 in order to determine the transmission ratio existing between the primary shaft 7 and the secondary shaft 8. The servo-controls 11 and 12 are controlled by a control unit 13 which is connected to a series of sensors (known and not shown) detecting commands from the driver and measuring the value of some reference magnitudes of the engine 2 and the transmission members 1.

A respective memory (known and not shown) in the control unit 13 stores the transmissibility function $T_{cl}(x)$ of the clutch 4, which provides, for each position x of the clutch 4 (or rather for each position x of the pressure plate of the clutch 4), the torque $T_{cl}$ transmitted by means of the clutch 4 from the drive shaft 10 to the primary shaft 7 of the gear change 5. In general, the transmissibility function $T_{cl}(x)$ of the clutch 4 may be obtained from equation [0] in which F(x) is the force exerted by the pressure plate of the clutch 4, $\mu$ is the coefficient of friction between the discs of the clutch 4 and SIGN( ) is a binary sign function and assumes the value ±1 depending on whether the angular speed $\omega_m(t)$ of the drive shaft 10 is higher or lower than the angular speed $\omega_1(t)$ of the primary shaft 7.

$$T_{cl}(x)=F(x)*\mu*\mathrm{SIGN}(\omega_m(t)-\omega_1(t)) \qquad [0]$$

During a gear change from a current gear A to a subsequent higher gear B (i.e. having a longer transmission ratio), the control unit 13 controls the servo-controls 11 and 12 in order to open the clutch 4, to disengage the gear A, to engage the gear B and lastly to reclose the clutch 4. During the above-mentioned gear change operations, the control unit 13 keeps the drive torque $T_m$ generated by the engine 2 constantly under control in order to maintain the angular speed $\omega_m(t)$ of the drive shaft 10 substantially equal to the desired values.

The operations to perform the disengagement of the gear A having a transmission ratio $\tau_A$ in order to engage the new gear B having a transmission ratio $\tau_B$ are described below with particular reference to the time graphs of FIG. 2; in particular, the gear B is a higher gear than the gear A and therefore the transmission ratio $\tau_B$ of the gear B is greater than the transmission ratio $\tau_A$ of the gear A.

Figure 2:
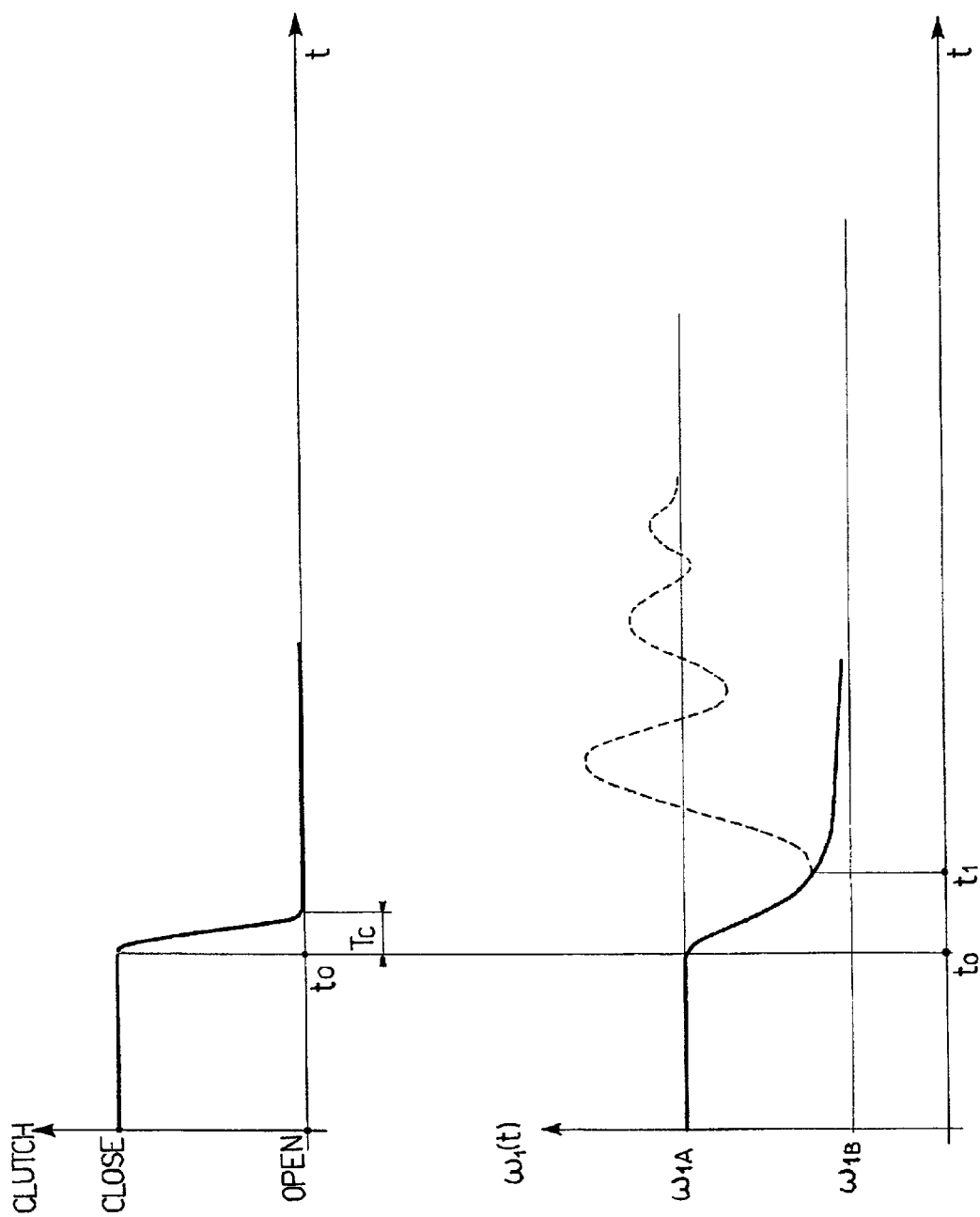
FIG. 2 shows the development over time of some magnitudes during a gear disengagement operation performed in accordance with the method of the present invention.

FIG. 2 in particular shows the development over time of the position of the clutch 4, which position is shown on the ordinate axis designated "clutch" and comprises a deactivated or closed clutch position (shown in FIG. 2 by "Close")

in which the primary shaft 8 is coupled to the drive shaft 10, and an actuated or open clutch position (shown in FIG. 2 by "Open") in which the primary shaft 8 is not coupled to the drive shaft 10. The development over time of the angular speed $\omega_1(t)$ of the primary shaft 7 is also shown in FIG. 2.

At an instant immediately preceding the gear change in which the gear A is still engaged, the primary shaft 7 has an angular speed $\omega_{1A}$ equal to the angular speed $\omega_{mA}$ of the drive shaft 10, while the secondary shaft 8 has an angular speed $\omega_2$; the angular speeds $\omega_{1A}$ and $\omega_2$ are correlated with one another by the equation $$\omega_2 = \omega_{1A} * \tau_A \quad [1]$$

At an instant immediately following the gear change in which the gear B has just been engaged, the primary shaft 7 has an angular speed $\omega_{1B}$ equal to the angular speed $\omega_{mB}$ of the drive shaft 10, while the secondary shaft 8 has an angular speed $\omega_{2B}$; the angular speeds $\omega_{1B}$ and $\omega_{2B}$ are correlated with one another by the equation $$\omega_{2B} = \omega_{1B} * \tau_B \quad [2]$$

Assuming initially that the gear change operations take place in a time interval small enough not to make appreciable changes to the speed of the vehicle, the angular speed $\omega_2(t)$ of the secondary shaft 8 (which is strictly linked to the speed of the wheels 3 and therefore to the speed of the vehicle) does not change during the gear change operations; this means that the angular speed $\omega_2$ of the secondary shaft 8 immediately prior to the gear change is equal to the angular speed $\omega_{2B}$ of the secondary shaft 8 immediately after the gear change. It can be assumed from this that:

$$\omega_2 = \omega_{2B} = \omega_{1B} * \tau_B = \omega_{1A} * \tau_A \quad [3]$$

$$\omega_{1B} = \omega_{1A} * (\tau_A / \tau_B) \quad [4]$$

$$\omega_{1B} < \omega_{1A} \quad [5]$$

It will be appreciated from the above that during the gear change from gear A to gear B, the primary shaft 7 has to be uncoupled from the drive shaft 10 by actuating the clutch 4, the gear A has to be disengaged, the speed of the primary shaft 7 has to be reduced from the value $\omega_{1A}$ to the value $\omega_{1B}$, the gear B has to be engaged, and the primary shaft 7 has to be coupled to the drive shaft 10 by deactivating the clutch 4.

Assuming that it is wished to commence the gear change at a conventional instant $t_o$ (following a specific request from the vehicle driver), the clutch 4 is actuated by a substantially stepped control, i.e. the clutch 4 is caused to move from the deactivated or closed state to the actuated or open state in the smallest possible time interval $T_c$ compatible with the physical limits imposed by the mechanics in play.

It is important to note that the assembly of the primary and secondary shafts 7, 8 of the gear change 5, the differential 6, the axle shafts 9 and the wheels 3 form a kinematic system which has its own inertial mass and its own torsional elasticity (due to the sum of all the potential deformations of the components of the kinematic system 14) which is loaded with a torque value equal to the drive torque $C_m$ generated by the engine 2 when motion is transmitted from the engine 2 to the wheels 3.

The abrupt opening, i.e. according to a substantially stepped law, of the clutch 4 almost instantaneously cancels out the torque applied to the primary shaft 7 and, as a result of the energy stored in the elasticity of the kinematic system 14, triggers, in the angular speeds $\omega_1(t)$ and $\omega_2(t)$ of the primary and secondary shafts 7, 8, oscillations whose initial extent may also be relatively high (up to 30–40% of the initial values $\omega_{1A}$ and $\omega_2$ of the angular speeds $\omega_1(t)$ and $\omega_2(t)$) that tend to be attenuated according to a law of exponential type. In FIG. 2, an example of the possible development over time of the oscillations of the angular speed $\omega_1(t)$, in the absence of other factors, described below, blocking the natural development of these oscillations, is shown in dashed lines in FIG. 2. It should be noted that the oscillation is always triggered with a reduction of the angular speed $\omega_1(t)$ since the drive torque $C_m$ that has generated the rotation of the system is abruptly missing; in other words, the first oscillation half-wave is always negative, i.e. it tends to reduce the angular speed $\omega_1(t)$ with respect to its value $\omega_{1A}$ at the instant $t_0$.

The abrupt opening of the clutch 4 takes place when the clutch 4 is opened in a time lower than the duration of the first quarter-wave of the actual oscillation frequency of the mechanical system of which the primary shaft 7 is part; this condition is normally provided by a substantially stepped opening of the clutch 4. It will be appreciated that the higher the speed of opening of the clutch 4, the greater the amplitude of the oscillation that will be triggered in the angular speeds $\omega_1(t)$ and $\omega_2(t)$ of the primary and secondary shafts 7, 8; therefore, by regulating the speed of opening of the clutch 4 it is possible to regulate the amplitude of this oscillation.

The disengagement of the gear A is performed when the oscillation has brought the angular speed $\omega_1(t)$ of the primary shaft 7 relatively close to the angular speed $\omega_{1B}$ that the primary shaft 7 must assume to perform the engagement of the successive gear B. In this way, at the end of the disengagement of the gear A the angular speed $\omega_1(t)$ of the primary shaft 7 is already close to the angular speed $\omega_{1B}$ that the primary shaft 7 must assume to perform the engagement of the successive gear B with a substantial reduction of the synchronisation time of the new gear B, i.e. of the time taken by the synchronisers (known and not shown) to match the angular speed $\omega_1(t)$ of the primary shaft to the angular speed $\omega_{1B}$ imposed by the new gear B.

In order in particular to maximise the positive effect of reduction of the angular speed $\omega_1(t)$ of the primary shaft 7, the disengagement of the gear A takes place around the maximum amplitude of an oscillation half-wave and in particular around the maximum amplitude of the first oscillation half-wave. By disengaging the gear A around the maximum amplitude of the first oscillation half-wave, moreover, the oscillation of the angular speed $\omega_1(t)$ of the primary shaft 7 is blocked as it occurs.

It should be noted that when proceeding according to the disengagement method described above, in addition to obtaining the optimum conditions for minimising the subsequent synchronisation time, the time needed to achieve the complete disengagement of the gear A is also reduced to a minimum, since both the clutch 4 and the servo-control 11 are actuated in the shortest possible time.

"In order to disengage the gear A around the maximum amplitude of the first oscillation half-wave, it is enough to actuate the servo-control 12 before actuating the servo-control 11 of the clutch 4, or to actuate the servo-control 12 simultaneously with the actuation of the servo-control 11 of the clutch 4, or in any case before the clutch 4 has started to slip. In this way, the secondary shaft 8 is loaded with a force generated by the servo-control 12 which tends to disengage the gear A when the primary shaft 7 is still rigid with the drive shaft 10 via the clutch 4; in these conditions, the primary shaft 7 does not manage to move as a result of the forces of interaction between the primary shaft 7 and the secondary shaft 8 generated by the torque transmitted by the gear A which remains engaged. When the oscillation of the angular speed $\omega_1(t)$ of the primary shaft 7 is around the maximum amplitude of an oscillation half-wave, the torque transmitted by the gear A is progressively reduced until it is cancelled out and makes it possible for the gear A to be disengaged as a result of the force exerted by the servo-control 12 previously actuated (in FIG. 2, the instant at which the gear A is disengaged is shown by $t_1$)."

In other words, the servo-control 12 is actuated (i.e. pressurised) before actuating the servo-control 11 of the clutch 4, but the thrust force that the servo-control 12 generates on the secondary shaft 8 is not enough to disengage the gear A until the torque transmitted by the gear A has been substantially reduced with respect to the initial value equal to the drive torque $C_m$ generated by the engine 2; moreover, the torque transmitted by the gear A is sufficiently reduced to enable the disengagement of the gear A only around the maximum amplitude of an oscillation half-wave, i.e. for the first time around the maximum amplitude of the first oscillation half-wave.

It has been observed, in particular, that when actuating (i.e. pressurising) the servo-control 12 before actuating the servo-control 11 of the clutch 4, the disengagement of the gear A takes place only when the angular speed $\omega_1(t)$ of the primary shaft 7 has exceeded 80% of the maximum amplitude of the relative oscillation half-wave.

According to a different embodiment, the servo-control 12 is actuated (i.e. pressurised) when the difference between the angular speed $\omega_1(t)$ of the primary shaft 7 and the speed $\omega_m(t)$ of the drive shaft 10 is higher as an absolute value than 50 rpm.

According to a possible embodiment, the duration of the time interval $T_c$ may be adjusted to vary the maximum amplitude of the oscillations triggered in the angular speed $\omega_1(t)$ of the primary shaft 7 as a function of the difference between the angular speed $\omega_{1A}$ of the primary shaft 7 immediately before the gear change and the angular speed $\omega_{1B}$ of the primary shaft 7 immediately after the gear change.

During the stage of reclosure of the clutch 4 after engaging the gear B, the angular speed $\omega_m(t)$ of the drive shaft 10 is caused to equal the angular speed $\omega_1(t)$ of the primary shaft 7, this angular speed $\omega_1(t)$ being imposed by the speed of the vehicle since the primary shaft 7 is angularly rigid with the drive wheels 3 via the axle shafts 9, the differential 6, the secondary shaft 8 and the gearing of the gear B.

During the stage of reclosure of the clutch 4, the clutch 4 is sliding and transmits a torque $T_{cl}$ between the drive shaft 10 and the primary shaft 7; in this situation, the law of motion is given by equation [6] in which $J_m$ represents the moment of inertia of the engine 2 and $\omega'_m(t)$ the time derivative of the angular speed $\omega_m(t)$ of the drive shaft 10, i.e. the angular acceleration of the drive shaft 10.

$$J_m*\omega'_m(t)=T_m(t)-T_{cl}(t) \quad [6]$$

Two further equations derive directly from equation [6]:

$$\omega'_m(t)=(T_m(t)-T_{cl}(t))/J_m \quad [7]$$

$$T_{cl}(t)=T_m(t)-J_m*\omega'_m(t) \quad [8]$$

In order to perform a relatively rapid reclosure of the clutch 4 while at the same time ensuring the comfort of the passengers, it is advantageous to regulate the engine 2 to avoid the generation of working torque (in these circumstances, in practice, the engine generates a slightly negative drive torque $T_m$ as a result of the friction torques) and only partly to reclose the clutch 4, so as to cause the clutch 4 to transmit a constant and predetermined torque $T_{cl}^*$ to the primary shaft 7 of the gear change for a time interval sufficient to exhaust the surplus kinetic energy of the drive shaft 10 and to cause the drive shaft 10 to rotate substantially at an angular speed $\omega_m(t)$ equal to the angular speed $\omega_1(t)$ of the primary shaft 7. In these conditions, the engine 2 generates a mechanical energy lower than that needed for traction and transmitted by the clutch 4 and the energy deficit is recovered by discharging the kinetic energy possessed by the drive shaft 10 which slows down.

When the drive shaft 10 reaches an angular speed $\omega_m(t)$ close to the angular speed $\omega_1(t)$ of the primary shaft 7, the engine 2 is regulated in order progressively to reset the generation of a positive drive torque $T_m$; when the angular speed $\omega_m(t)$ of the drive shaft 10 is very close, i.e. substantially equal, to the angular speed $\omega_1(t)$ of the primary shaft 7, the clutch 4 is completely reclosed and the gear change is thus completed.

In other words, the method of reclosing the clutch 4 entails rapidly bringing the clutch 4 into a predetermined position $x^*$ in order to transmit a constant torque $T_{cl}^*$ (substantially equal to the drive torque $T^*$ supplied by the engine 2 immediately before the gear change) and to maintain the clutch 4 in the predetermined position $x^*$ until the synchronisation between the drive shaft 10 and the primary shaft 7 has taken place. The engine 2 is in particular set to supply a zero torque $T_m$ (or, more generally, lower than the torque $T_{cl}^*$ transmitted by the clutch 4) until the angular speed $\omega_m(t)$ of the drive shaft 10 is close to the angular speed $\omega_1(t)$ of the primary shaft 7; at this point, the engine 2 is set progressively to increase the torque $T_m$ supplied and the clutch is completely reclosed only when the angular speed $\omega_m(t)$ of the drive shaft 10 is substantially equal (i.e. very close) to the angular speed $\omega_1(t)$ of the primary shaft 7.

In general, before the gear change the vehicle has an acceleration $a^*$ produced by a drive torque $T^*$ supplied by the engine 2 as a result of the driving actions of the driver; moreover, in order to ensure maximum comfort, the gear change operations need to cause the least disturbance to the vehicle's progress. It is therefore advantageous for the torque $T_{cl}^*$ transmitted by the clutch 4 during the deceleration stage of the drive shaft 10 to be substantially equal to the torque $T^*$ in order to keep the law of motion of the vehicle unchanged and to prevent any disturbance to the passengers.

During the gear change operations, the control unit 13 calculates the value of the drive torque $T^*$ supplied by the engine 2 before the gear change and, via the transmissibility function $T_{cl}(x)$ of the clutch 4, determines the position $x^*$ into which the clutch 4 (or rather the pressure plate of the clutch 4) is to be brought in order to transmit a torque $T_{cl}^*$ substantially equal (less the friction torques) to the torque $T^*$.

It should be noted that from the point of view of the drive wheels (i.e. from the point of view of the vehicle), the gear change operations are completed at the time at which the clutch 4 has been brought to the position $x^*$ in order to transmit the torque $T_{cl}^*$ as from that time the drive wheels again receive the torque $T^*$ which they received prior to the gear change. This torque $T^*$ is obviously supplied by the engine 2, and in an initial stage is produced using the kinetic energy of the drive shaft 10 (which consequently slows down in order to synchronise with the primary shaft 7), while at a subsequent stage it is again produced by the engine 2 through the combustion of fuel.

It will be appreciated from the above that traction is returned to the vehicle before the gear change is finally completed with the complete reclosure of the clutch 4, as the drive wheels 3 receive full traction as soon as the stage of synchronisation of the drive shaft 10 with the primary shaft 7 commences, as during this stage the primary shaft 7 already receives from the clutch 4 a torque $T_{cl}^*$ substantially equal to the torque $T^*$ received before the gear change. In this way, the actual duration of the gear change from the point of view of the vehicle is smaller, as the zero driving torque stage is reduced.

Figure 3:
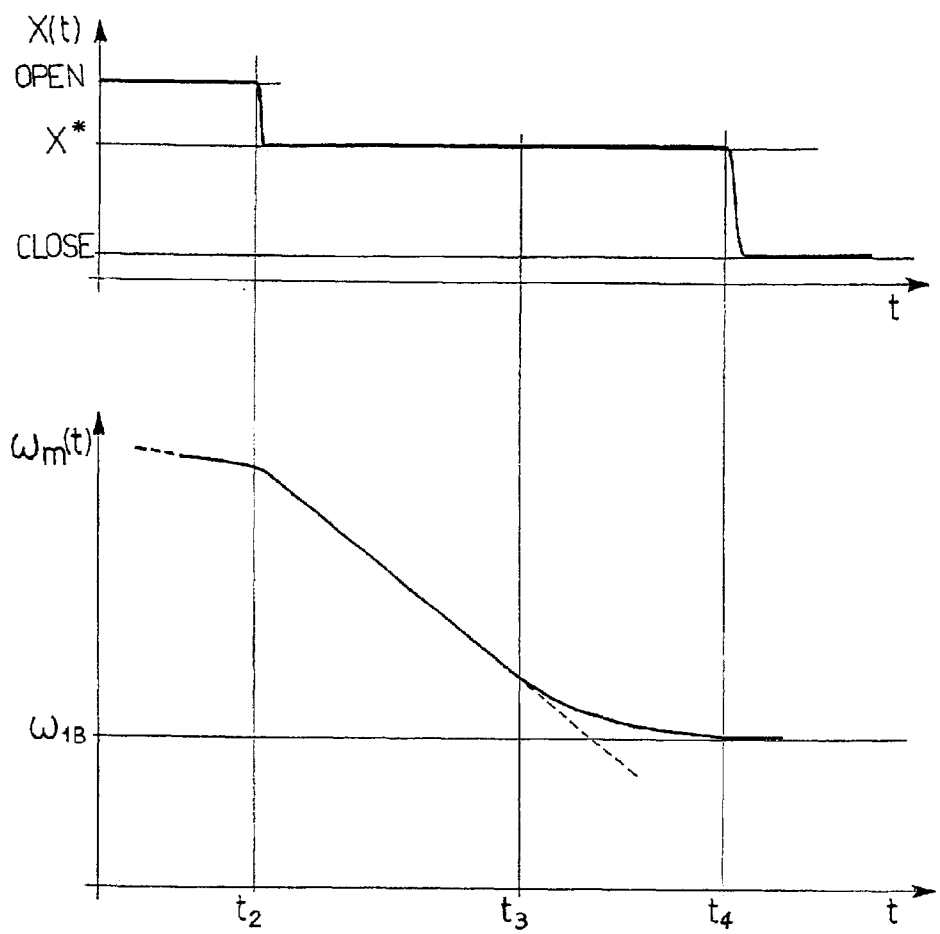
FIG. 3 shows the development over time of some magnitudes during an operation to reclose the clutch performed in accordance with the method of the present invention.

FIG. 3 shows the development over time of the position x(t) of the clutch 4 and the development over time of the angular speed $\omega_m(t)$ of the drive shaft 10 during the stage of reclosure of the clutch 4; the engagement of the gear B is in particular completed at an instant $t_2$, at which the clutch 4 is rapidly brought from an open position to a predetermined intermediate position $x^*$ in order to transmit a constant torque $T_{cl}^*$ (substantially equal to the drive torque $T^*$ supplied by the engine 2 immediately prior to the gear change). The clutch 4 is maintained in the predetermined position $x^*$ up to an instant $t_4$ in which the synchronisation between the drive shaft 10 and the primary shaft 7 is completed; at the instant $t_4$, the clutch 4 is completely reclosed and the gear change is complete.

Between the instant $t_2$, in which the clutch 4 is rapidly brought from a completely open position to the predetermined intermediate position $x^*$ in order to transmit the constant torque $T_{cl}^*$, and the instant $t_3$, in which the angular speed $\omega_m(t)$ of the drive shaft 10 is close to the angular speed $\omega_1(t)$ of the primary shaft 7 (i.e. between the two angular speeds $\omega_m(t)$ and $\omega_1(t)$ there is a difference of between 50 and 200 rpm), the engine 2 is regulated by the control unit 13 to supply a zero torque $T_m(t)$ (or, more generally, lower than the torque $T_{cl}^*$ transmitted by the clutch 4). From the instant $t_3$, in which the angular speed $\omega_m(t)$ of the drive shaft 10 is close to the angular speed $\omega_1(t)$ of the primary shaft 7, the engine 2 is adjusted by the control unit 13 in order progressively to increase the torque $T_m(t)$ supplied so as to cause the angular speed $\omega_m(t)$ of the drive shaft 10 to vary according to a law of motion of the parabolic type, which is substantially tangential to the angular speed $\omega_1(t)$ of the primary shaft 7 (angular speed $\omega_1(t)$ substantially constant in the time interval in question).

It will be appreciated from the above that the angular speed $\omega_m(t)$ of the drive shaft 10 prior to the instant $t_2$ has a constant and slightly negative time derivative $\omega'_m(t)$ as can be seen from equation [7] since the torque $T_{cl}(t)$ transmitted by the clutch 4 is zero and the drive torque $T_m(t)$ generated by the engine 2 is slightly negative as a result of the friction torques (the engine 2 is not supplied and does not generate working torque). Consequently, the angular speed $\omega_m(t)$ of the drive shaft 10 before the instant $t_2$ has a linear law of motion with a slight negative gradient.

The angular speed $\omega_m(t)$ of the drive shaft 10 between the instant $t_2$ and the instant $t_3$ has a constant and highly negative time derivative $\omega'_m(t)$ as can be seen from equation [7] since the torque $T_{cl}(t)$ transmitted by the clutch 4 is constant and equal to the drive torque $T^*$ supplied by the engine 2 immediately prior to the gear change and the drive torque $T_m(t)$ generated by the engine 2 is slightly negative as a result of the friction torques (the engine 2 is not supplied and does not generate working torque). Consequently, the angular speed $\omega_m(t)$ of the drive shaft 10 between the instant $t_2$ and the instant $t_3$ has a linear law of motion with a marked negative gradient.

The angular speed $\omega_m(t)$ of the drive shaft 10 between the instant $t_3$ and the and the instant $t_4$ has a negative derivative $\omega'_m(t)$ whose modulus decreases in a linear manner over time as a result of the progressive increase of the drive torque $T_m(t)$ generated by the engine 2 under the control of the control unit 13. As shown by equation [8], the torque $T_{cl}(t)$ transmitted by the clutch 4 is constant and equal to the drive torque $T^*$ supplied by the engine 2 immediately prior to the gear change and the drive torque $T_m(t)$ generated by the engine 2 increases in a linear manner as a result of the adjustments made by the control unit 13. Consequently, the angular speed $\omega_m(t)$ of the drive shaft 10 between the instant $t_3$ and the instant $t_4$ has a parabolic law of motion; in practice, if the derivative $\omega'_m(t)$ of the angular speed $\omega_m(t)$ has a linear increase over time, the angular speed $\omega_m(t)$ has a law of motion of parabolic type.

According to a different embodiment, the law of the motion of the angular speed $\omega_m(t)$ could not be a law of parabolic type. However, the use of a law of parabolic type is particularly advantageous as the law of parabolic type makes it possible to cause the angular speed $\omega_m(t)$ to synchronise with the angular speed $\omega_1(t)$ in an extremely gentle and gradual way (as the parabola of the angular speed $\omega_m(t)$ is designed such that it is substantially tangential to the straight line of the angular speed $\omega_1(t)$); moreover, the creation of a parabolic law of motion is relatively simple as it requires the derivative $\omega'_m(t)$ of the angular speed $\omega_m(t)$ to have a linear increase over time, i.e. (on the basis of equation [2]), it requires the drive torque $T_m(t)$ generated by the engine 2 to show a linear increase over time.

Figure 4:
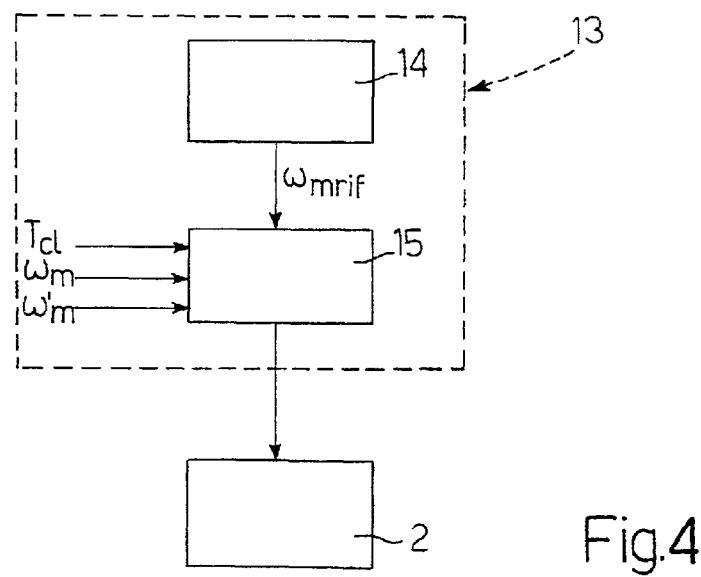
FIG. 4 is a block diagram of part of a control unit of FIG. 1.

As shown in FIG. 4, the control unit 13 comprises a generation block 14 which, from the instant $t_3$, generates a signal $\omega_{mrif}(t)$ indicating the ideal course that the angular speed $\omega_m(t)$ should take between the instant $t_3$ and the instant $t_4$. The control unit 13 further comprises a drive block 15 which receives as input the reference signal $\omega_{mrif}(t)$, the reading of the angular speed $\omega_m(t)$, the reading of the time derivative $\omega'_m(t)$ of the angular speed $\omega_m(t)$ and the reading of the torque $T_{cl}(t)$ transmitted by the clutch 4 and is adapted to drive the engine 2 so as to cause the angular speed $\omega_m(t)$ to follow the course of the reference signal $\omega_{mrif}(t)$ within a predetermined tolerance.

The drive block 15 controls the engine 2 in torque, i.e. it communicates to a control unit (known and not shown) of the engine 2 the value of the objective torque $T_{mob}(t)$ that the engine 2 has to supply such that the angular speed $\omega_m(t)$ follows the course of the reference signal $\omega_{mrif}(t)$. The value of the objective torque $T_{mob}(t)$ is calculated by the drive block 15 by means of the sum of two independent components $T_{mob1}(t)$ and $T_{mob2}(t)$; the value of $T_{mob1}(t)$ is calculated by an open loop control logic on the basis of the torque $T_{cl}(t)$ transmitted by the clutch 4, while the value $T_{mob2}(t)$ is calculated by means of a closed loop control logic on the basis of the difference between the angular speed $\omega_m(t)$ and the reference signal $\omega_{mrif}(t)$. More particularly, the value of the objective torque $T_{mob}(t)$ is calculated by applying the following equations [9], [10] and [11], in which K is a coefficient of gain depending on the operating condition.

$$T_{mob}(t) = T_{mob1}(t) + T_{mob2}(t) \qquad [9]$$

$$T_{mob1}(t) = K^*(\omega_{mrif}(t) - \omega_m(t)) \qquad [10]$$

$$T_{mob2}(t) = T_{cl}(t) + J_m^* \omega'_m(t) \qquad [11]$$

By varying the value of the coefficient of gain K and/or the course of the reference signal $\omega_{mrif}(t)$, it is possible to vary both the duration of the time interval between the instant $t_3$ and the instant $t_4$ (i.e. the stage of renewed torque at the end of the gear change), and the gradient with which the angular speed $\omega_m(t)$ of the drive shaft 10 approaches the angular speed $\omega_1(t)$ of the primary shaft 7. It should be noted that the actual duration of the stage of renewed torque substantially has no effect on the dynamic behaviour of the vehicle, as the traction on the drive wheels 3 has already been returned from the instant $t_3$ as described above.

In general, wear and temperature variations affect both the coefficient $\mu$ of friction between the discs of the clutch 4 and the force $F(x)$ exerted by the pressure plate of the clutch 4.

$$T_{cl}(t)=T_m(t)-J_m*\omega'_m(t) \qquad [8]$$

It will be appreciated from equation [8] that it is possible to calculate the torque $T_{cl}$ transmitted by the clutch 4 when the drive torque $T_m$ generated by the engine 2 is known, which torque $T_m$ can be obtained in a known manner from the operating parameters of the engine 2, when the moment of inertia $J_m$ of the engine 2 is known, which moment $J_m$ is constant and can be readily obtained, and when the angular acceleration $\omega'_m(t)$ of the drive shaft 10 is known, which acceleration $\omega'_m(t)$ can be calculated simply from the observation of the angular speed $\omega_m(t)$ of the drive shaft 10.

As the position of the clutch 4 is known as it is determined by the servo-control 11, by applying equation [8] it is possible to calculate the value of the torque $T_{cl}$ actually transmitted by the clutch 4 in this position.

During the stage of reclosure of the clutch 4 after engagement of the gear B, the purpose of the control unit 13 is to cause the angular speed $\omega_m(t)$ of the drive shaft 10 to be equal to the angular speed $\omega_1(t)$ of the primary shaft 7, i.e. to provide the drive shaft 10 with an angular acceleration $\omega'_m(t)$ which is not zero (positive or negative depending on whether the drive shaft 10 is slower or faster than the primary shaft 7). As shown by equation [1], in order to provide the drive shaft 10 with an angular acceleration $\omega'_m(t)$ which is not zero, the control unit 13 has two degrees of freedom, i.e. two independent variables to be controlled: the torque $T_{cl}$ transmitted by the clutch 4 and the drive torque $T_m$ generated by the engine 2.

In order to ensure optimum conditions for accurately determining the value of the torque $T_{cl}$ actually transmitted by the clutch 4 at a given position of this clutch 4, and therefore to make it possible to update the transmissibility function $T_{cl}(x)$ of the clutch 4, the control unit 13 sets the engine 2 to generate a constant drive torque $T_m$ (for instance a drive torque $T_m$ of mere maintenance, i.e. zero from the point of view of the clutch 4) and at the same time controls the servo-control 11 to dispose the clutch 4 in a fixed position so that the torque $T_{cl}$ transmitted by the clutch 4 has a predetermined fixed value greater than that supplied by the engine. This makes it possible to obtain an increase or a decrease (depending on whether the drive shaft 10 is slower or faster than the primary shaft 7) of the angular speed $\omega_m(t)$ of the drive shaft 10. This increase or decrease will in any case be constant as it is determined by a constant angular acceleration $\omega'_m(t)$ as shown by equation [7] in which all the terms to the right of the equal sign are constant.

The fact that the angular acceleration $\omega'_m(t)$ is maintained constant in a certain time interval makes it possible to calculate this angular acceleration $\omega'_m(t)$ simply and with a high degree of accuracy from the observation of the angular speed $\omega_m(t)$ of the drive shaft 10. In this way, the actual value of the torque $T_{cl}$ transmitted by the clutch 4 may also be accurately calculated by applying equation [8].

According to a different embodiment, in order to calculate the actual value of the torque $T_{cl}$ transmitted by the clutch 4, all supply to the engine 2 is discontinued in order to prevent any working torque from being generated, and the drive torque $T_m$ is therefore negative and will depend solely on the internal friction torques of the engine 2, whose value can be readily calculated with a relatively high degree of accuracy.

It will be appreciated from the above that the calculation of the actual value of the torque $T_{cl}$ transmitted by the clutch 4 in a given position of this clutch 4 is simple and generally highly accurate, as the use of equation [8] involves only physical magnitudes of the engine 2.

Once the actual value of the torque $T_{cl}$ transmitted by the clutch 4 has been obtained, it is compared with the value obtained from the transmissibility function $T_{cl}(x)$ stored in the control unit 13 in order to calculate an index of "degradation" due to the variations over time of the mechanical properties of the clutch 4. The degradation index obtained is then filtered, taking account of the degradation indices obtained from previous calculation stages, and used to update the transmissibility function $T_{cl}(x)$ of the clutch 4.

What is claimed is:

1. A method for performing a gear disengagement in a servo-controlled manual gear change (5), which comprises a primary shaft (7) connected to an engine (2) and a secondary shaft (8) which transmits movement to drive wheels (3); the method including generating an oscillation with respect to the angular speed ($\omega_1(t)$) of the primary shaft (7) of the gear change (5) and performing disengagement of the gear (A) when this oscillation has caused the angular speed ($\omega_1(t)$) of the primary shaft (7) to be relatively close to the angular speed ($\omega_{1B}$) that the primary shaft (7) has to assume to carry out the engagement of the subsequent gear (B).

2. A method as claimed in claim 1, characterised in that the oscillation with respect to the angular speed ($\omega_{1B}(t)$) of the primary shaft (7) is generated by reducing the torque transmitted by the clutch (4) more rapidly than the reduction of the drive torque ($C_m$) supplied by the engine (2) in order to differentiate the angular speed ($\omega_1(t)$) of the primary shaft (7) from the angular speed ($\omega_m(t)$) of the drive shaft (10).

3. A method as claimed in claim 1, characterised in that the oscillation with respect to the angular speed ($\omega_1(t)$) of the primary shaft (7) is generated via an abrupt opening of the relative clutch (4).

4. A method as claimed in claim 3, characterised in that the clutch (4) is opened according to a substantially stepped law.

5. A method as claimed in claim 3, characterised in that the clutch (4) is opened in a time smaller than the duration of the first quarter-wave of the actual oscillation frequency of the mechanical system of which the primary shaft (7) is part.

6. A method as claimed in claim 1, characterised in that the law of opening of the clutch (4) is adjusted as a function of a desired value of the amplitude of this oscillation.

7. A method as claimed in claim 1, characterised in that the law of opening of the clutch (4) is adjusted as a function of the deviation between the angular speed ($\omega_{1A}$) of the primary shaft (7) immediately prior to the gear change (5) and the angular speed ($\omega_{1B}$) of the primary shaft (7) immediately after the gear change (5).

8. A method as claimed in claim 1, characterised in that the disengagement of the gear (A) is performed around the maximum amplitude of an oscillation half-wave.

9. A method as claimed in claim 8, characterised in that this disengagement of the gear (A) is performed around the maximum amplitude of the first oscillation half-wave.

10. A method as claimed in claim 9, characterised in that this disengagement of the gear (A) is performed when the angular speed of the primary shaft (7) has exceeded 80% of the maximum amplitude of the relative oscillation half-wave.

11. A method as claimed in claim 1, characterised in that first actuator means (12) which control the disengagement of the gear (A) are actuated before the clutch (4) has started to slip.

12. A method as claimed in claim 1, characterised in that first actuator means (12) which control the disengagement of the gear (A) are actuated before actuating second actuator means (11) which control the opening of the clutch (4).

13. A method as claimed in claim 1, characterised in that first actuator means (12) which control the disengagement of the gear (A) are actuated simultaneously with the actuation of second actuator means (11) which control the opening of the clutch (4).

14. A method as claimed in claim 1, characterised in that first actuator means (12) which control the disengagement of the gear (A) are actuated when the difference between the angular speed ($\omega_1(t)$) of the primary shaft (7) and the angular speed ($\omega_m(t)$) of the drive shaft (10) is higher as an absolute value than 50 rpm.

15. A method as claimed in claim 1, characterised in that the clutch (4) is completely reclosed only when the angular speed ($\omega_m$) of the drive shaft (10) is substantially equal to the angular speed ($\omega_1$) of the primary shaft (7).

16. A method for performing a gear change in a servo-controlled manual gear change (5), which method includes generating an oscillation with respect to the angular speed ($\omega_1(t)$) of a primary shaft (7) of the gear change (5) and performing the disengagement of the gear (A) when this oscillation has caused the angular speed ($\omega_1(t)$) of the primary shaft (7) to be relatively close to the angular speed ($\omega_{1B}$) that the primary shaft has to assume in order to perform the engagement of the subsequent gear (B), the method then including the engagement of the subsequent gear (B) and the reclosure of the clutch (4) in order to cause the angular speed ($\omega_m$) of the drive shaft (10) to equal the angular speed ($\omega_1$) of the primary shaft (7) of the gear change (5), the clutch (4) being brought into a predetermined position (x*) in order to transmit a constant torque ($T_{cl}^*$) and the clutch (4) being maintained in the predetermined position (x*) until the synchronisation of the drive shaft (10) and the primary shaft (7) has taken place.

17. A method as claimed in claim 16, characterised in that, in the predetermined position (x*), the clutch (4) transmits a constant torque ($T_{cl}^*$) substantially equal to the drive torque (T*) supplied by the engine (2) immediately before the gear change.

18. A method as claimed in claim 16, characterised in that the clutch (4) is brought into the predetermined position (x*) according to a stepped displacement law.

19. A method as claimed in claim 16, characterised in that the engine (2) is regulated to supply a constant torque ($T_m$) lower than the torque ($T_{cl}^*$) transmitted by the clutch (4) until the angular speed ($\omega_m$) of the drive shaft (10) is close to the angular speed ($\omega_1$) of the primary shaft (7).

20. A method as claimed in claim 19, characterised in that power generation by engine (2) is discontinued so as not to generate working torque until the angular speed ($\omega_m$) of the drive shaft (10) is close to the angular speed ($\omega_1$) of the primary shaft (7).

21. A method as claimed in claim 19, characterised in that the engine (2) is regulated progressively to increase the torque ($T_m$) supplied when the angular speed ($\omega_m$) of the drive shaft (10) is close to the angular speed ($\omega_1$) of the primary shaft (7).

22. A method as claimed in claim 21, characterised in that the drive torque ($T_m$) generated by the engine (2) is controlled in order to cause the angular speed ($\omega_m$) of the drive shaft (10) to follow the reference profile ($\omega_{mrif}$).

23. A method as claimed in claim 22, characterised in that in order to control the drive torque ($T_m$) generated by the engine (2), a reference value ($T_{mob}$) for the torque to be supplied by the engine (2) is generated.

24. A method as claimed in claim 23, characterised in that the torque reference value ($T_{mob}$) comprises a first open loop component ($T_{mob1}$) dependent on the torque ($T_{cl}$) transmitted by the clutch (4).

25. A method as claimed in claim 24, characterised in that the first component ($T_{mob1}$) is calculated as the sum of the torque ($T_{cl}$) transmitted by the clutch (4) and the product of the moment of inertia ($J_m$) of the engine (2) and the angular acceleration ($\omega'_m$) of the drive shaft (10).

26. A method as claimed in claim 23, characterised in that the torque reference value ($T_{mob}$) comprises a second closed loop component ($T_{mob2}$) dependent on the difference between the angular speed ($\omega_m$) of the drive shaft (10) and the reference profile ($\omega_{mrif}$).

27. A method as claimed in claim 16, characterised in that a reference profile ($\omega_{mrif}$) is generated for the angular speed ($\omega_m$) of the drive shaft (10) and in that the engine (2) is controlled to cause the angular speed ($\omega_m$) of the drive shaft (10) to follow the reference profile ($\omega_{mrif}$).

28. A method as claimed in claim 27, characterised in that the reference profile ($\omega_{mrif}$) is generated when the angular speed ($\omega_m$) of the drive shaft (10) is close to the angular speed ($\omega_1$) of the primary shaft (7) of the gear change (5).

29. A method as claimed in claim 27, characterised in that the reference profile ($\omega_{mrif}$) has a final portion substantially tangential to the angular speed ($\omega_1$) of the primary shaft (7) of the gear change (5).

30. A method as claimed in claim 27, characterised in that the reference profile ($\omega_{mrif}$) has a final portion of parabolic type substantially tangential to the angular speed ($\omega_1$) of the primary shaft (7) of the gear change (5).

31. A method as claimed in claim 16, characterised in that the actual value of the torque ($T_{cl}$) transmitted by the clutch (4) is calculated by subtracting the product of the moment of inertia ($J_m$) of the engine (2) and the angular acceleration ($\omega'_m$) of the drive shaft (10) from the torque ($T_m$) generated by the engine (2), the actual value of the torque ($T_{cl}$) actually transmitted by the clutch (4) being used to update a transmissibility function ($T_{cl}(x)$) of the clutch (4).

32. A method as claimed in claim 31, characterised in that the actual value of the torque ($T_{cl}$) transmitted by the clutch (4) is calculated by subtracting the product of the moment of inertia ($J_m$) of the engine (2) and the angular acceleration ($\omega'_m$) of the drive shaft (10) from the torque ($T_m$) generated by the engine (2).

33. A method for performing a gear disengagement in a servo-controlled manual gear change (5), the method including generating an oscillation with respect to the angular speed ($\omega_1(t)$) of the primary shaft (7) of the gear change (5) and performing disengagement of the gear (A) when this oscillation has caused the angular speed ($\omega_1(t)$) of the primary shaft (7) to be relatively close to the angular speed ($\omega_{1B}$) that the primary shaft (7) has to assume to carry out the engagement of the subsequent gear (B); characterised in that the oscillation with respect to the angular speed ($\omega_1(t)$) of the primary shaft (7) is generated via an abrupt opening of the relative clutch (4); and characterised in that the clutch (4) is opened in a time smaller than the duration of the first quarter-wave of the actual oscillation frequency of the mechanical system of which the primary shaft (7) is part.

34. A method for performing a gear disengagement in a servo-controlled manual gear change (5), the method including generating an oscillation with respect to the angular speed ($\omega_1(t)$) of the primary shaft (7) of the gear change (5) and performing disengagement of the gear (A) when this oscillation has caused the angular speed ($\omega_1(t)$) of the primary shaft (7) to be relatively close to the angular speed ($\omega_{1B}$) that the primary shaft (7) has to assume to carry out the engagement of the subsequent gear (B); and characterised in that the law of opening of the clutch (4) is adjusted as a function of a desired value of the amplitude of this oscillation.

35. A method for performing a gear disengagement in a servo-controlled manual gear change (5), the method including generating an oscillation with respect to the angular speed ($\omega_1(t)$) of the primary shaft (7) of the gear change (5) and performing disengagement of the gear (A) when this oscillation has caused the angular speed ($\omega_1(t)$) of the primary shaft (7) to be relatively close to the angular speed ($\omega_{1B}$) that the primary shaft (7) has to assume to carry out the engagement of the subsequent gear (B); and characterised in that the law of opening of the clutch (4) is adjusted as a function of the deviation between the angular speed ($\omega_{1A}$) of the primary shaft (7) immediately prior to the gear change (5) and the angular speed ($\omega_{1B}$) of the primary shaft (7) immediately after the gear change (5).

36. A method for performing a gear disengagement in a servo-controlled manual gear change (5), the method including generating an oscillation with respect to the angular speed ($\omega_1(t)$) of the primary shaft (7) of the gear change (5) and performing disengagement of the gear (A) when this oscillation has caused the angular speed ($\omega_1(t)$) of the primary shaft (7) to be relatively close to the angular speed ($\omega_{1B}$) that the primary shaft (7) has to assume to carry out the engagement of the subsequent gear B); and characterised in that first actuator means (12) which control the disengagement of the gear (A) are actuated when the difference between the angular speed ($\omega_1(t)$) of the primary shaft (7) and the angular speed ($\omega_m(t)$) of the drive shaft (10) is higher as an absolute value than 50 rpm.

* * * * *